US011014280B2

(12) United States Patent
Siegl

(10) Patent No.: US 11,014,280 B2
(45) Date of Patent: May 25, 2021

(54) PREFORM FOR PRODUCING A PLASTIC CONTAINER, PRODUCTION OF THE PREFORM AND PLASTIC CONTAINER PRODUCED FROM THE PREFORM, AS WELL AS ITS PRODUCTION

(71) Applicant: ALPLA WERKE ALWIN LEHNER GMBH & CO. KG, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 302 days.

(21) Appl. No.: 15/669,230

(22) Filed: Aug. 4, 2017

(65) Prior Publication Data
US 2017/0334120 A1 Nov. 23, 2017

Related U.S. Application Data

(63) Continuation of application No. PCT/EP2016/051128, filed on Jan. 20, 2016.

(30) Foreign Application Priority Data

Feb. 6, 2015 (CH) ......................................... 159/15

(51) Int. Cl.
| | |
|---|---|
| B29C 49/00 | (2006.01) |
| B29C 49/12 | (2006.01) |
| B65D 1/02 | (2006.01) |
| B29C 49/04 | (2006.01) |
| C08G 63/181 | (2006.01) |
| C08L 67/02 | (2006.01) |
| B29C 49/06 | (2006.01) |
| C08J 5/00 | (2006.01) |
| B29C 48/09 | (2019.01) |
| B29K 67/00 | (2006.01) |
| B29L 31/00 | (2006.01) |
| B29C 48/00 | (2019.01) |

(52) U.S. Cl.
CPC .......... *B29C 49/0005* (2013.01); *B29C 49/04* (2013.01); *B29C 49/06* (2013.01); *B29C 49/12* (2013.01); *B65D 1/0207* (2013.01); *C08G 63/181* (2013.01); *C08J 5/00* (2013.01); *C08L 67/02* (2013.01); *B29B 2911/14986* (2013.01); *B29B 2911/14993* (2013.01); *B29C 48/0017* (2019.02); *B29C 48/09* (2019.02); *B29K 2067/04* (2013.01); *B29K 2995/006* (2013.01); *B29L 2031/712* (2013.01); *B29L 2031/7158* (2013.01); *C08J 2367/06* (2013.01)

(58) Field of Classification Search
CPC ..... B29C 49/0005; B29C 49/04; B29C 49/06; B29C 49/12; B29C 48/09
See application file for complete search history.

(56) References Cited

U.S. PATENT DOCUMENTS

| | | | | |
|---|---|---|---|---|
| 2007/0248778 | A1* | 10/2007 | Kezios | .................... B29C 49/12 428/35.7 |
| 2013/0183470 | A1* | 7/2013 | Codd | .................... C08G 63/80 428/36.92 |
| 2014/0336349 | A1 | 11/2014 | Sipos et al. | |
| 2015/0064383 | A1* | 3/2015 | Kriegel | ............... B29C 49/0005 428/36.92 |
| 2015/0110983 | A1 | 4/2015 | Kriegel et al. | |
| 2015/0336320 | A1 | 11/2015 | Poulat et al. | |

FOREIGN PATENT DOCUMENTS

| | | |
|---|---|---|
| WO | WO 2013/055860 A1 | 4/2013 |
| WO | WO 2013/062408 A1 | 5/2013 |
| WO | WO 2014/032731 A1 | 3/2014 |
| WO | WO 2015/015243 A1 | 2/2015 |
| WO | WO 2015/031907 A1 | 3/2015 |
| WO | WO 2015/031910 A1 | 3/2015 |

OTHER PUBLICATIONS

Compressed Air Best Practices, Jun. 2006, accessed from https://www.airbestpractices.com/sites/default/files/2006/CABP_June_06_LR.pdf on Jun. 17, 2020. (Year: 2006).*
Plastics Technology, General Drying questions, published Aug. 26, 2013, accessed from http://www.ptonline.com/knowledgecenter/Plastics-Drying/Drying-Questions/General-Drying-Questions on Jun. 17, 2020. (Year: 2013).*
International Search Report (PCT/ISA/210) dated Mar. 24, 2016, by the European Patent Office as the International Searching Authority for International Application No. PCT/EP2016/051128.
Written Opinion (PCT/ISA/237) dated "Date WO dated", by the European Patent Office as the International Searching Authority for International Application No. Mar. 24, 2016PCT/EP2016/051128.
G. Wei et al., "Theoretical and Technical Basics of Plastic Forming", Xi'an Jiaotong University Press, First Edition, First Printing, Mar. 2013, p. 55.
L. Wang et al., "Polymer Materials", First Edition, First Printing, Jan. 2009, p. 133.
German Translation of Office Action dated Sep. 10, 2020, by the Chinese Patent Office in corresponding Chinese Patent Application No. 201680008863.0, and a partial English Translation of the German Translation. (9 pages).

* cited by examiner

*Primary Examiner* — Kelly M Gambetta
(74) *Attorney, Agent, or Firm* — Buchanan Ingersoll & Rooney PC

(57) ABSTRACT

A preform is disclosed for producing a plastic container. The production of the preform as well as a plastic container that is produced from the preform and its production are also disclosed.

26 Claims, No Drawings

PREFORM FOR PRODUCING A PLASTIC CONTAINER, PRODUCTION OF THE PREFORM AND PLASTIC CONTAINER PRODUCED FROM THE PREFORM, AS WELL AS ITS PRODUCTION

RELATED APPLICATIONS

This application claims priority as a continuation application under 35 U.S.C. § 120 to PCT/EP2016/051128, which was filed as an International Application on Jan. 20, 2016 designating the U.S., and which claims priority to Swiss Application No. 159/15 filed in Switzerland on Feb. 6, 2015. The entire contents of these applications are hereby incorporated by reference in their entireties.

FIELD

A preform is disclosed for producing a plastic container. The production of the preform as well as a plastic container that is produced from the preform and its production are also disclosed.

BACKGROUND INFORMATION

Containers made of tin or multicolored sheet metal, glass or else ceramic, common in the past, are increasingly being replaced by containers made of plastic.

Primarily plastic containers are now being used for the packaging of fluid substances, for example beverages; free-flowing foods, such as, e.g., ketchup, sugo, pesto, sauces, mustard, mayonnaise, and the like; household products; care products; cosmetics, etc. The low weight and the lower costs certainly play a significant role in this substitution. The use of recyclable plastic materials, the use of bioplastics, and the overall more advantageous total energy balance in their production also contribute to promoting the acceptance of plastic containers, in particular plastic bottles, by consumers.

A large number of the plastic bottles and similar plastic containers now used are produced in a stretch-blow-molding method. With this method, first a so-called preform with, for example, an elongated, tube-like shape is produced, which preform is closed with a bottom on one of its longitudinal ends and has a neck section with means for positive clamping of a closure part equipped with corresponding engagement means on the other longitudinal end. The means for positive clamping of a closure part can be, for example, threaded sections made on the outside wall of the neck part or bayonet-like projections or corresponding recesses. The production of the preform can be carried out in an injection-molding method. However, alternative production methods for preforms are also known, for example impact extrusion or extrusion blow molding. The production of the preforms can be done separated in time and/or space from the subsequent stretch-blow-molding method. In an alternative method, the preform that is produced can be processed immediately after its production without interim cooling. For stretch blow molding, the preform is inserted into a mold cavity of a blow mold and for example, inflated by a fluid, such as air, which is introduced with overpressure, expanded in the radial and axial directions. In this case, the preform is stretched in the axial direction in addition with an elongated mandrel that is run-in through the neck opening of the preform. After the elongation/blow-molding process, the finished plastic container is removed from the blow mold.

Because of the usually fairly random arrangement of molecules, the polyethylene terephthalate (PET) that is used in many cases for the production of the preforms and the plastic containers manufactured therefrom has only relatively low mechanical strength and also only relatively poor barrier properties. The subsequent stretch-blow-molding method results in a stretch-solidification of the PET, which leads to convergence as well as to parallel alignment of the molecules. Intermolecular interactions of the molecules that are brought closer to one another and the molecule chains that are aligned parallel to one another can result in a considerable improvement of the mechanical strength of the plastics used.

The advantageous effects of the stretch-solidification occur relatively late in the case of PET used for the production of plastic containers. The long routes resulting therefrom represent a significant technical challenge in the case of radial and axial elongation. In order to achieve these high stretching rates with PET, the preform must have relatively small dimensions. The length of the preform is, for example, about 10 cm, and the latter has a diameter of about 2 cm. The PET container produced from the preform in the stretch-blow-molding method is, however, in many cases relatively large and in the case of known mineral water or soft drink bottle has, for example, a length of about 24 cm and a width of about 7 cm. Because of the high stretching rates, the elongated PET container has only relatively small wall thicknesses, which has a negative effect on the barrier properties of the PET container, in particular in comparison to oxygen and water.

SUMMARY

A preform is disclosed for a stretch-blow-molded plastic container, the preform comprising: an elongated, tube-like preform body that is closed with a preform bottom on one of its longitudinal ends; and a preform neck on its other longitudinal end, wherein at least in some places, the preform consists of polyethylene furanoate (PEF) selected to have a viscosity of 0.75 dl/g to 0.9 dl/g measured according to a measurement method in accordance with ASTM D4603 and a water content of less than 50 ppm for production of the preform.

A method is also disclosed for producing a preform having an elongated, tube-like preform body that is closed with a preform bottom on one of its longitudinal ends, and a preform neck on its other longitudinal end, the method comprising: producing the preform to at least in some places consist of polyethylene furanoate (PEF) which in production of the preform has a viscosity of 0.75 dl/g to 0.9 dl/g measured according to a measurement method in accordance with ASTM D4603 and a water content of less than 50 ppm; and drying the preform at a drying temperature that is 100° C. to 160° C.

DETAILED DESCRIPTION

An exemplary preform is disclosed which, in a case of stretching rates in a stretch-blow-molding method necessary for reaching the required mechanical strength, results in a plastic container that possesses adequate barrier properties in comparison to oxygen and water.

An exemplary preform for producing a plastic container in a stretch-blow-molding method is provided, which preform preform has an elongated, tube-like preform body that is closed with a preform bottom on one of its longitudinal ends and that has a preform neck on its other longitudinal end. At least in some places, the preform includes (e.g., consist of) polyethylene furanoate (PEF) which in the production of the preform has a viscosity of 0.75 dl/g to 0.9 dl/g, measured according to a measurement method in accordance with ASTM D4603, and a water content of less than 50 ppm.

In many aspects of its production and its processibility, polyethylene furanoate (PEF) has great similarities to the well-known polyethylene terephthalate (PET). Like PET, PEF can achieve necessary and/or desired mechanical strength by the stretch-solidification of the preform during stretch blow molding for the production of a container. While PET, however, has relatively poor barrier properties in comparison to oxygen, carbon dioxide, or water because of the wall thickness reduction due to increasing elongation, these drawbacks in the case of PEF occur to a significantly lesser extent.

In comparison to oxygen, PEF has barrier properties that are higher by a factor of about 6 to 10 than in the case of PET with the same wall thickness. The barrier properties in comparison to carbon dioxide are greater by a factor of about 3 to 6 than in the case of PET. In comparison to water, PEF also has barrier properties that are about twice as high as in the case of PET.

So that the target mechanical strength and the desired barrier properties of the container that is later stretch blow molded from the produced preform can be achieved, it is already taken into account for the production of the preform that an optimal molecular length of the PEF chains is achieved. Therefore, for the production of the preforms, a viscosity of the PEF that is 0.75 dl/g to 0.9 dl/g is set. The viscosity is in this case determined according to a measurement method analogously to ASTM D4603. This standardized measurement method was developed specifically for the determination of the viscosity of PET, but can be applied to PEF in an analogous form. The PEF that is processed to form the preform in this case has a water content of less than 50 ppm. To this end, the PEF is dried before its processing. For example, the PEF is dried to this end for 20 hours at 150° C. and an air dew point of below −30° C. The drying can be accelerated by the increase in temperature, but in this case, it is recommended to use a stirring mechanism or a corresponding device in order to avoid a sticking of the PEF material. In addition, more energy can also be introduced by infrared or microwave radiation in order to further shorten the drying time. The drying of the PEF can also be carried out in a vacuum.

The setting of the viscosity and the water content of the PEF before it is processed to form the preform ensures the retention of the molecular structure of the PEF and in particular its chain length. By the drying of the PEF, the hydrolytic degradation of the chains is reduced, and a chain cleavage of the PEF can be suppressed by hydrolysis, for example in the case of injection-molding of the PEF. The preparation of the PEF should in this case be carried out as close in time as possible to its further processing to form a preform, since otherwise oxidative degradation reactions will harm the PEF. In this case, an exemplary time period of up to hours after the preparation of the PEF is considered to be close in time. In this case, the PEF used for the production of the preform can have a linear chain design or else can contain smaller or larger branches.

In an exemplary variant embodiment of the preform, the entire preform including the preform neck, which is often not elongated in a subsequent stretch-blow-molding method, can consist of PEF.

In another exemplary variant embodiment of the preform, the PEF that is used in its production can contain (i.e., possess) for example, 10% to 100% bio-based PEF. The use of bio-based PEF is desirable for ecological reasons, since only renewable substances are used for the production of PEF.

In an exemplary variant embodiment of the preform, the PEF that is used in its production can include up to 100% regenerated material. Because of the production method that is used and the temperatures that are used for the drying and further processing of the PEF, possible contaminants play a subordinate role with other substances, for example with foreign polymers. Therefore, preforms that contain regenerated material and the containers that are produced therefrom can come into direct contact with the filling material without limitations.

Another exemplary variant embodiment of the preform can provide that the PEF be physically or chemically foamed. In this case, the PEF can have a degree of foaming of 10% to 30%. The foaming of the PEF in this case can be carried out within the mold cavity or else even in a melt reservoir before the actual injection into the injection-molding mold for production of the preform is done.

In an exemplary variant embodiment of the preform, the PEF that is used for its production can be produced in a solid-state polycondensation (SSD) method or in a melt-to-resin (MTR) method. For the production, in this case, a catalyst is selected, which originates from the group that includes (e.g., consists of) alkali metals, alkaline-earth metals, transition metals or metals of the periodic table. For example, the catalyst is used as a salt, oxide, glycolate, or complex of these elements.

In an exemplary variant embodiment of the preform, the PEF can include up to 20% by weight of foreign substances. Considered to be foreign substances in terms of this invention are in this case dyes, fillers, stabilizing additives, such as, e.g., glass fibers or glass balls, or mixtures thereof, additives or foreign polymers.

An exemplary variant embodiment of the preform can provide that the PEF used in its production is mixed with additional plastics. These additional plastics can be selected from the group that includes (e.g., consists of) PET, polyester, polyamide, polycarbonate, polyolefins, silicones, their copolymers, and mixtures of plastics.

So that a hydrolytic cleavage of the chain lengths does not result, the PEF can be dried, for example, at an exemplary drying temperature of 100° C. to 160° C. As an alternative, when using special stirring mechanisms that prevent sticking of the PEFs and further loosen possible sticking, the PEF can also be dried at temperatures of greater than, for example, 160° C. to 220° C. Starting from a temperature of about 220° C., a normal fluid-driven drying process is no longer possible despite a stirring mechanism and possible special coatings of the pellets since the PEF begins to melt. The drying process of the PEF can be supported by the supply of energy in the form of microwave radiation and can even be carried out under vacuum.

For the production of the preform, the PEF can, for example, be heated to a processing temperature that is higher than the melting point but lower than 290° C., measured at the outlet of an extruder for conveying the PEF to the producing device for the preform. The PEF can, for example, be heated to temperatures of between 220° C. and 290° C. These temperatures are effective for the further processing of the PEF in the injection-molding method, in the extrusion-blow-molding method, or in the impact-extruding method.

In an exemplary variant embodiment, the preform can be produced in an injection-molding method in a mold cavity with a hot-runner system with a needle valve of for example, 3.9 mm to 6.1 mm. For example, the diameter of the needle valve is 4.5 mm to 5.5 mm. In the case of such hot-runner systems with larger needle valves, relatively viscous PEF melts with relatively higher viscosity can also be injected into the mold. As a result, the injection-molding process can be performed at lower temperatures. This results in shorter dwell times under higher temperatures of the PEF melts in the injection-molding unit. As a result, thermal degradation of the PEF molecule chains can be counteracted. Long molecule chains of the PEF are desired in order to promote the stretch-solidification.

In another exemplary variant embodiment, thermally oxidative degradation of the PEF in the extruder can be suppressed by displacement of the oxygen, for example by nitrogen at the extruder entrance. Because of deficient oxygen, oxidative degradation processes can be reduced, the yellowing decreases, and the time period to copolymerize the PEF together with other polyesters by re-esterification increases. A copolymerization can be advantageous to incorporate other esters in the PEF molecule chains and thus to modify the properties of the PEF to the desired extent. For example, a copolymerization of the PEF with PET, PBT, PEN, PLA may be of interest.

In an exemplary variant embodiment of a method for producing a preform in the injection-molding method, the PEF can be introduced into the injection-molding mold at a speed of, for example, 11 g/sec to 30 g/sec. The quick injection-molding process, for example, in the case of thin-walled preforms, can result in a certain material orientation, which in turn can be advantageous in the case of stretch-solidification in the subsequent stretch-blow-molding method, since the molecule chains are already pre-oriented.

Another exemplary method variant can provide that PEF be introduced into the mold cavity of the injection-molding mold at a melt pressure of 700 bar to 3000 bar. This pressure is for example, measured at the tip of the screw of the supply extruder or in the melt reservoir upstream from the injection unit. This allows the processing of more viscous PEF melts, which can have an advantageous effect on the thermal degradation of the molecule chains.

In an alternative production variant, the preform can be produced in an extrusion-blow-molding method. The extrusion-blow-molding method allows higher degrees of freedom with respect to the forming of the preform. For example, an injection core that has to be removed from the mold is no longer needed. As a result, the preform, in its interior, can also have undercuts. At this point, it can be pointed out that the preform can be designed and configured in principle with undercuts in its interior even during injection-molding. However, this can involve more complex plant equipment, for example in the form of an injection core or the like. As a result, however, the part costs are increased, and the cycle times are often also lengthened.

An exemplary variant embodiment of the production method of the preform in the extrusion-blow-molding method can provide that the PEF is introduced into an extrusion channel of an extruder head at an extrusion pressure of for example, 100 bar to 300 bar. In this case, the extrusion pressure relates to the pressure of the PEF melts immediately before entry into the extrusion channel of the extrusion head. In the case of the selected pressures, more viscous PEF melts can also be processed in the extrusion-blow-molding method. The thus slighter heating of the PEF melts has a positive effect on the prevention of thermal degradation of the PEF molecule chains.

In an exemplary method variant, the PEF can be extruded through an annular gap nozzle with a width of, for example, 1 mm to 4 mm as a hose, before a section of the extruded hose is inflated to form a preform in a mold cavity of a blow mold through a medium that is injected with overpressure.

In another exemplary method variant for producing a preform, the latter can also be produced in an impact-extruding method within a mold cavity.

The preform that is produced in the injection-molding method, in the extrusion-blow-molding method, or in the impact-extruding method, is cooled after its production. To this end, the produced preform, in a first step still within the mold cavity, can be cooled to a temperature that is for example, 30° C. to 110° C. below the melting point, but above the glass transition temperature of the PEF.

In a method variant, the produced preform, after its removal from the mold cavity into a cooling sleeve, can be cooled to an outside-wall temperature of for example, 40° C. to 70° C. before it is removed from the cooling sleeve for further processing or for temporary storage. The cooling sleeve ensures as uniform and gentle a cooling of the preform as possible. Gluing-together of the preform or damage to the preform outside wall can thus be avoided.

An exemplary plastic container as disclosed herein has a container body that is closed with a container bottom and with a container neck with a pour opening that connects to the container body and that it is manufactured in a stretch-blow-molding method from a preform, which is produced as disclosed herein. The plastic container includes (e.g., consists of) at least in select part(s), or for example, even in its entirety, stretch-solidified PEF. With respect to its processibility and stretch-solidification, PEF has great similarities to the well-known PET. While PET however, because of the wall-thickness reduction due to increasing elongation, has relatively poor barrier properties in comparison to oxygen, carbon dioxide, or water, these drawbacks in the case of PEF occur to a significantly lesser extent. In comparison to oxygen, PEF has barrier properties that are higher by a factor of about 6 to 10 than in the case of PET with the same wall thickness. The barrier properties in comparison to carbon dioxide are higher by a factor of about 3 to 6 than in the case of PET. In comparison to water, PEF also has barrier properties that are about twice as high as in the case of PET.

The plastic container that is stretch blow molded from a PEF preform reaches the required and/or desired mechanical strength as early as in the case of a stretching ratio, measured over the surface contour, of, for example, 100% to 1000% in comparison to the preform. This is achieved in such a way that the PEF molecule chains already have a specific pre-orientation because of the special production method of the preform. In the case of the stretch-blow-molding method, adequate convergence as well as adequate parallel alignment of the PEF molecule chains therefore occur relatively early. The improved mechanical strength is then a result of the intermolecular interactions of the molecule chains that are brought closer to one another and aligned parallel to one another.

In the case of a plastic container that has a rotationally-symmetrical container body, reaching a required stretch-solidification can be manifested in such a way that at half the height of its container body above the periphery, it has a wall-thickness distribution that does not deviate by more than, for example, about ±10% from nominal wall thickness.

In the case of a plastic container with an oval container body with a depth-to-width ratio of up to 1:2, reaching the desired stretch-solidification can be manifested in such a way that at half the height of the container body above the periphery, the latter has a wall-thickness distribution that does not deviate by more than for example, about ±25% from nominal wall thickness.

In the case of a plastic container that has a so-called flat container body, whose depth-to-width ratio is greater than 1:2 but less than 1:10, reaching the desired stretch-solidification can be manifested in such a way that at half the height of the container body above the periphery, it has a wall-thickness distribution that does not deviate by more than for example, about ±50% from nominal wall thickness.

Another indication that the desired stretch-solidification has been reached is that, when filling with a $CO_2$-containing filler and with a $CO_2$ content at 23° C. of 4 to 10 g/l when the temperature rises to 38° C. within 24 hours, the PEF plastic container sustains only one increase in volume, which is less than for example, 10%.

In the case of the PEF plastic containers that are filled in the filled state with an inert gas, in particular nitrogen, which results at 23° C. in an internal pressure of 0.2 bar to 2 bar, reaching the desired stretch-solidification can be controlled in such a way that the plastic container, when the temperature rises to 38° C. within 24 hours, sustains only one increase in volume, which is for example, less than 10%.

A sufficiently stretch-solidified plastic container, which as a pressure container is stretch blow molded from a preform that includes (e.g., consists of) at least in select part(s) or its entirety, PEF, can have a pressure resistance of at least 100% above the filling pressure at 23° C. As a result, it is in general ensured that the plastic container, in the case of use as directed, fails neither during filling nor in later handling by consumers.

For the production of a plastic container from a preform manufactured as disclosed herein, in a stretch-blow-molding method, the exemplary preform, after heating its preform body to a processing temperature that is for example, 5° C. to 25° C. above the glass transition temperature of the PEF, is inserted into a mold cavity of a blow mold and inflated by a blow-molding medium that is injected with overpressure and in this case axially elongated by means of an elongated mandrel. Then, the biaxially-elongated plastic container is removed from the blow mold.

For the stretch blow molding of the preform according to exemplary embodiments, it can be important that the preform has taken up as little water as possible and also, if possible, contains no other molecules, such as waxes, oils, etc., as the latter are often used for color master batches. As a result, in the case of low stretching rates and elongation speeds, sliding of the molecule chains can also be prevented. The heating of the preform is thus also used for drying and for evaporating the above-mentioned foreign substances. Then again, the stretch-blow-molding process of the preform is carried out as absolutely cold as possible. The colder the preform used in the mold cavity, the earlier the stretch-solidification of the PEF material occurs. At the selected temperature of the preform, both requirements can be satisfactorily met. In this case, the temperature relates both to the outside wall and to the inside wall of the preform and is set to, for example, 5° C. to 25° C. above the glass transition temperature. Ideally, the temperature of the preform is for example, between 105° C. and 145° C.

In an exemplary method variant, the axial elongation of the preform can be carried out at an elongated mandrel speed of for example, 0.5 m/s to 3 m/s. The axial feed speed of the elongated mandrel is so fast in this exemplary case that the front end of the elongated mandrel is always in contact with the bladder that is formed from the preform and moves just as quickly as the bladder in the expansion of the bladder owing to the fluid introduced with pressure during the blow-molding process.

The blow-molding medium, such as air, can be introduced in two steps in another exemplary method variant. In a first step, the blow-molding medium is introduced into the mold cavity at a first flow rate of for example, 0.02 l/s to 5 l/s. At the same time, the elongated mandrel is axially fed so quickly that it is not detached from the bladder that is formed by the injected blow-molding medium from the preform. The feed speed of the elongated mandrel thus corresponds to the longitudinal expansion of the bladder formed from the preform. As soon as the bladder rests on the bottom of the mold cavity, the blow-molding medium is then injected in a second step at a second flow rate of for example, 0.5 l/s to 10 l/s until the bladder that is formed from the preform rests on the inner walls of the blow mold delimiting the mold cavity.

The pressure at which the blow-molding medium is injected into the preform can be for example, 5 bar to 50 bar.

For a uniformly quick elongation of the PEF preform in exemplary embodiments it can be important that its expansion not be hampered by a counterpressure in order to give the PEF molecule chains no time to slide, creep, or pull out. This counterpressure can be avoided in such a way that the mold cavity of the blow mold is vented at a flow rate of for example, 0.02 l/s to 5 l/s. For this purpose, corresponding vent holes can be provided in the blow mold.

Stretch-blow-molded plastic containers made of PEF preforms can be used as PET containers. In this case, PEF in comparison to PET with comparable wall thicknesses has significantly better barrier properties in comparison to oxygen, carbon dioxide, and water. Plastic containers made of PEF can therefore be produced in many cases without additional layers of foreign polymers or additives, for example to increase the oxygen barriers. This, the fact that PEF can be produced entirely from biological and renewable raw materials and its complete recyclability increase the ecological advantages of PEF containers in comparison to comparable containers, for example made of PET.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for producing a plastic container with a container body that is closed with a container bottom and with a container neck with a pour opening that connects to the container body, the method comprising:
   producing a preform having an elongated, tube-like preform body that is closed with a preform bottom on one of its longitudinal ends, and a preform neck on its other longitudinal end, wherein at least in some places, the preform consists of polyethylene furanoate (PEF);
   drying the PEF at a drying temperature that is from 100° C. to 160° C. at an air dew point of below −30° C.;
   then producing the preform wherein the PEF in production of the preform has a viscosity of 0.75 dl/g to 0.9 dl/g measured according to a measurement method in accordance with ASTM D4603 and a water content of less than 50 ppm; and producing the plastic container in a stretch-blow-molding method from the preform produced, wherein in comparison to the preform, the plastic container has a stretching ratio of 100% to less than 450%, measured over a surface contour.

2. A method for producing a plastic container with a container body that is closed with a container bottom and with a container neck with a pour opening that connects to the container body, the method comprising:
producing a preform having an elongated, tube-like preform body that is closed with a preform bottom on one of its longitudinal ends, and a preform neck on its other longitudinal end, wherein at least in some places, the preform consists of polyethylene furanoate (PEF);
drying the PEF at a temperature from 160° C. to 220° C. at an air dew point of below −30° C. and stirring with a stirring mechanism during the drying process;
then producing the preform, wherein the PEF in production of the preform has a viscosity of 0.75 dl/g to 0.9 dl/g measured according to a measurement method in accordance with ASTM D4603 and a water content of less than 50 ppm; and
producing the plastic container in a stretch-blow-molding method from the preform produced, wherein in comparison to the preform, the plastic container has a stretching ratio of 100% to less than 450%, measured over a surface contour.

3. Method according to claim 2, wherein the drying of the PET is supported by a supply of energy in a form of microwave radiation.

4. Method according to claim 3, wherein the drying of the PEF is performed under a vacuum or a non-oxidative oxygen-displacing gas.

5. Method according to claim 1, comprising:
heating the PEF for production of the preform to a processing temperature that is higher than a melting point but lower than 290° C., measured at an outlet of an extruder for conveying the PEF to a producing device for the preform.

6. Method according to claim 1, comprising:
producing the preform in an injection-molding method in a mold cavity with a hot-runner system with a needle valve of 3.9 mm to 6.1 mm.

7. Method according to claim 6, comprising:
introducing the PEF into an injection-molding mold at a speed of 11 g/sec to 30 g/sec.

8. Method according to claim 6, comprising:
introducing the PEF into an injection-molding mold at a melt pressure of 700 bar to 3000 bar.

9. Method according to claim 1, comprising:
producing the preform by extrusion-blow-molding.

10. Method according to claim 9, comprising:
introducing the PEF into an extrusion channel of an extruder head at an extrusion pressure of 100 bar to 300 bar.

11. Method according to claim 10, wherein the PEF is extruded through an annular gap nozzle with a width of 1 mm to 4 mm as a hose, before a section of the extruded hose is inflated to form a preform in a mold cavity of a blow mold through a medium that is injected with overpressure.

12. Method according to claim 1, comprising:
producing the preform inside a mold cavity in an impact-extruding method.

13. Method according to one of claim 12, wherein the produced preform is cooled within the mold cavity to a temperature that is 30° C. to 110° C. below the melting point, but above a glass transition temperature of the PEF.

14. Method according to claim 13, wherein the produced preform, after its removal from the mold cavity into a cooling sleeve, is cooled to an outside-wall temperature of 40° C. to 70° C. before it is removed from the cooling sleeve for further processing or for temporary storage.

15. Method according to claim 1, wherein the plastic container has a rotationally-symmetrical cross-section at half a height of its container body, and in this area above a periphery, has a wall-thickness distribution that does not deviate by more than +/−10% from nominal wall thickness.

16. Method according to claim 1, wherein the plastic container has an oval container body with a depth-to-width ratio of up to 1 : 2, and at half a height of the container body above a periphery, has a wall-thickness distribution that does not deviate by more than +/−25% from nominal wall thickness.

17. Method according to claim 1, wherein the plastic container has a flat container body, whose depth-to-width ratio is greater than 1 : 2 but smaller than 1 : 10, and at half a height of the container body above a periphery, has a wall-thickness distribution that does not deviate by more than +/−50% from nominal wall thickness.

18. Method according to claim 1, wherein when filling with a $CO_2$-containing filler and with a $CO_2$ content at 23° C. of 4 to 10 g/l when temperature rises to 38° C. within 24 hours, said plastic container sustains only one increase in volume which is less than 10%.

19. Method according to claim 1, wherein in the filled state and at an internal pressure of 0.2 bar to 2 bar of an inert gas, at 23° C., the plastic container sustains one increase in volume which is less than 10%, when the temperature rises to 38° C. within 24 hours.

20. Method according to claim 1, wherein the plastic container is a pressure container and has a pressure resistance of at least 100% above a filling pressure at 23° C.

21. Method for producing a plastic container according to claim 1, comprising:
inserting the preform, after heating its preform body to a processing temperature that is 5° C. to 25° C. above a glass transition temperature of the PEF, into a mold cavity of a blow mold;
inflating the perform body by a blow-molding medium that is injected with overpressure, and axially elongating the preform body by an elongated mandrel; and
removing the preform body from the blow mold.

22. Method according to claim 21, wherein an axial elongation of the preform is carried out at an elongated mandrel speed of 0.5 m/s to 3 m/s.

23. Method according to claim 22, comprising:
introducing blow-molding medium in a first step into the mold cavity at a first flow rate of 0.02 l/s to 5 l/sec; and then injecting the flow molding medium in a second step at a second flow rate of 0.5 l/s to 5 l/s.

24. Method according to claim 23, wherein the mold cavity of the blow mold is vented at a flow rate of 0.02 l/s to 5 l/s.

25. Method according to claim 23, wherein the blow-molding medium is introduced into the preform at a pressure of 5 bar to 50 bar.

26. Method according to claim 1, comprising:
producing the preform in an injection-molding method in a mold cavity with a hot-runner system with a needle valve of 4.5 mm to 5.5 mm.

* * * * *